(12) United States Patent
Yang et al.

(10) Patent No.: US 9,446,379 B2
(45) Date of Patent: Sep. 20, 2016

(54) SCINTILLATION DETECTOR

(71) Applicant: Saint-Gobain Ceramics & Plastics, Inc., Worcester, MA (US)

(72) Inventors: Kan Yang, Solon, OH (US); Peter R. Menge, Novelty, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 99 days.

(21) Appl. No.: 14/316,901

(22) Filed: Jun. 27, 2014

(65) Prior Publication Data

US 2015/0001397 A1    Jan. 1, 2015

Related U.S. Application Data

(60) Provisional application No. 61/841,020, filed on Jun. 28, 2013.

(51) Int. Cl.
| | |
|---|---|
| *B01J 20/06* | (2006.01) |
| *B01J 20/08* | (2006.01) |
| *G01T 1/202* | (2006.01) |

(52) U.S. Cl.
CPC .............. *B01J 20/08* (2013.01); *B01J 20/06* (2013.01); *G01T 1/202* (2013.01); *Y10T 29/49826* (2015.01)

(58) Field of Classification Search
CPC .......... G01T 1/202; B01J 20/06; B01J 20/08
See application file for complete search history.

(56) References Cited

U.S. PATENT DOCUMENTS

| | | |
|---|---|---|
| 4,158,773 A | 6/1979 | Novak |
| 4,360,733 A | 11/1982 | Novak et al. |
| 4,383,175 A | 5/1983 | Toepke |
| 4,694,170 A | 9/1987 | Slodzian et al. |
| 4,764,677 A | 8/1988 | Spurney |
| 4,994,673 A | 2/1991 | Perna et al. |
| 5,087,818 A | 2/1992 | Bellian et al. |
| 5,283,439 A | 2/1994 | Bouissou et al. |
| 5,406,078 A | 4/1995 | Jacobson |
| 5,753,918 A | 5/1998 | Pandelisev |
| 5,869,836 A | 2/1999 | Linden et al. |
| 6,297,507 B1 | 10/2001 | Chen et al. |
| 6,373,066 B1 | 4/2002 | Penn |
| 6,433,340 B1 | 8/2002 | Penn |

(Continued)

FOREIGN PATENT DOCUMENTS

WO          9528597 A1    10/1995

OTHER PUBLICATIONS

International Search Report for PCT/US2014/044482, dated Oct. 23, 2014, 15 pages.

(Continued)

*Primary Examiner* — David Porta
*Assistant Examiner* — Mindy Vu
(74) *Attorney, Agent, or Firm* — Abel Law Group, LLP; Robert N Young

(57) ABSTRACT

An improved scintillation detector capable of withstanding harsh operating environments includes a scintillator in a sealed casing having an atmosphere with an oxygen content not greater than about 100 ppb and an oxygen scavenger in the atmosphere within the sealed casing. The scintillator can include a material that may be damaged by exposure to oxygen. The oxygen scavenger can include an oxidizable compound.

20 Claims, 5 Drawing Sheets

(56) References Cited

U.S. PATENT DOCUMENTS

| | | |
|---|---|---|
| 6,624,420 B1 | 9/2003 | Chai et al. |
| 6,657,201 B2 | 12/2003 | DeJule |
| 6,781,134 B1 | 8/2004 | Murray et al. |
| 6,844,419 B2 | 1/2005 | Raghavan et al. |
| 7,034,305 B2 | 4/2006 | Frederick et al. |
| 7,151,261 B2 | 12/2006 | Chai |
| 7,820,974 B2 | 10/2010 | Menge et al. |
| 8,704,189 B2 | 4/2014 | Frank et al. |
| 2005/0045821 A1 | 3/2005 | Noji et al. |
| 2005/0184241 A1 | 8/2005 | Clarke et al. |
| 2005/0253072 A1 | 11/2005 | Chai |
| 2006/0027742 A1 | 2/2006 | Srivastava et al. |
| 2006/0102834 A1 | 5/2006 | Mickael |
| 2007/0209581 A1 | 9/2007 | Ferrand et al. |
| 2009/0011298 A1* | 1/2009 | Sato .................. C01B 3/38 429/412 |
| 2009/0101816 A1 | 4/2009 | Noji et al. |
| 2009/0261253 A1 | 10/2009 | Menge et al. |
| 2010/0001209 A1 | 1/2010 | Osinski et al. |
| 2010/0072398 A1 | 3/2010 | Fruehauf |
| 2010/0092363 A1* | 4/2010 | Graeve .................. B82Y 30/00 423/263 |
| 2011/0114848 A1 | 5/2011 | Frank et al. |
| 2012/0186061 A1 | 7/2012 | Simonetti et al. |
| 2014/0183372 A1 | 7/2014 | Frank et al. |

OTHER PUBLICATIONS

Rozsa, C.M., et al., "Characteristics of Scintillators for Well Logging to 225C," Bicron Corporation, Newbury, OH 44065, 1989, 12 pages.

Rozsa, C. et al., "Stability of Bircon's Standard Logging Detectors", Bicron Corporation, Newbury, OH 44065, 1989, 3 pages.

* cited by examiner

SCINTILLATION DETECTOR

CROSS-REFERENCE TO RELATED APPLICATION

This Application claims priority under 35 U.S.C. §119(e) to U.S. Provisional Application No. 61/841,020 entitled "Scintillator Detector" by Yang et al., filed on Jun. 28, 2013. The above-referenced application is assigned to the current assignee hereof and is incorporated herein by reference in its entirety.

FIELD OF THE DISCLOSURE

The present disclosure is directed to scintillation detectors, particularly scintillation detectors that have very low oxygen content.

BACKGROUND

Scintillation detectors have been employed in various industrial applications, such as the oil and gas industry for well logging. Typically, such detectors have scintillator crystals made of an activated sodium iodide material that is effective for detecting gamma rays. Generally, the scintillator crystals are enclosed in tubes or casings, which include a window permitting radiation induced scintillation light to pass out of the scintillator casing for measurement by a light-sensing device such as a photomultiplier tube. The photomultiplier tube converts the light photons emitted from the scintillator into electrical pulses that are shaped and digitized by associated electronics that may be registered as counts and transmitted to analyzing equipment. In terms of well logging applications, the ability to detect gamma rays makes it possible to analyze rock strata as gamma rays are emitted from naturally occurring radioisotopes, typically of shales that surround hydrocarbon reservoirs.

Desired properties of scintillation detectors include high resolution, high brightness, and robust design to withstand mechanical and thermal loads, while providing a high quality hermetic seal to isolate the sensitive internals of the detector from harsh operating environments. In this latter aspect, a common practice in the utilization of scintillation detectors is to take measurements while drilling (MWD). For MWD applications, the detector should be ruggedized, that is, it should have a high shock resistance and be capable of withstanding high temperatures, while maintaining performance specifications for a reasonable lifetime.

Rare-earth halides are known to have improved scintillation properties such as resolution and brightness. However, such materials have been difficult to integrate into detectors rugged enough to withstand harsh environments and high temperatures.

As such, there continues to be a need for improved scintillation detectors, particularly scintillation detectors incorporating rare-earth halides or other state of the art scintillator materials that can withstand the rigors of industrial applications.

SUMMARY

Embodiments of the present invention provide an improved scintillation detector capable of withstanding harsh operating environments. As described herein, the operational lifespan of a halide scintillation detector operating at high temperatures can be extended by reducing the amount of $O_2$ and/or water vapor coming into contact with the scintillator to levels far below those found in the prior art. A scintillation detector according to an embodiment of the present invention includes a halide scintillator in a sealed casing having an atmosphere with an oxygen content not greater than about 100 ppb; and an oxygen scavenger in the atmosphere within the sealed casing.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The present disclosure may be better understood, and its numerous features and advantages made apparent to those skilled in the art by referencing the accompanying drawings.

The accompanying drawings are not intended to be drawn to scale. In the drawings, each identical or nearly identical component that is illustrated in various figures is represented by a like numeral. For purposes of clarity, not every component may be labeled in every drawing.

DESCRIPTION OF THE DRAWINGS

Embodiments of the present invention provide an improved scintillation detector capable of withstanding harsh operating environments and high temperatures while maintaining performance for a reasonable lifetime. As described herein, the operational lifespan of a halide scintillation detector operating at high temperatures can be extended by reducing the amount of $O_2$ and/or water vapor coming into contact with the scintillator to levels far below those found in the prior art.

In considering the performance of a scintillator, two important parameters are light output and energy resolution. Light output is a measure of how many scintillation photons are transmitted out of the scintillator to reach the photomultiplier, while energy resolution is a measure of how uniform the light output is from one scintillation pulse to another.

Some scintillating materials, especially halides or rare-earth halides such as $LaBr_3$, react with oxygen (or water vapor) at elevated temperatures. Oxidation degrades the scintillator by turning the surface of the scintillating material a darker color. This lowers the light output since the darker surface absorbs light. The emitted light is also more non-uniform, which worsens energy resolution. Oxidation of the scintillator material increases at higher temperatures. Thus, degradation of scintillating material upon exposure to oxygen and/or water vapor is particularly problematic for operation in high temperature environments such as oil well logging, where operating temperatures are commonly about 175° C. or more. If the residual $O_2$ and/or $H_2O$ can be removed from the scintillator casing before the detector is heated, the oxidation reaction can be prevented.

U.S. Pat. No. 7,820,974 to Menge et al., for "Scintillation Detector and Method of Making," which is assigned to the Assignee of the present application and which is hereby incorporated by reference in its entirety, teaches assembly of the detector in an inert atmosphere having an $O_2$ content that is not greater than 0.1 to 10 ppm. Applicants have discovered, however, that even using the methods and teachings of Menge, that premature failure of scintillation detectors are still resulting from the presence of $O_2$ and $H_2O$ inside the scintillator casing. Applicants have discovered that the reasons for this are two-fold: first, it is very difficult to ensure that the atmosphere within the scintillator casing actually has $O_2$ and $H_2O$ levels within the desired range; and second, even the those very small amounts of $O_2$ and $H_2O$ are still high enough to cause premature failure of the scintillation detector when operated at high temperatures.

Figure 1:
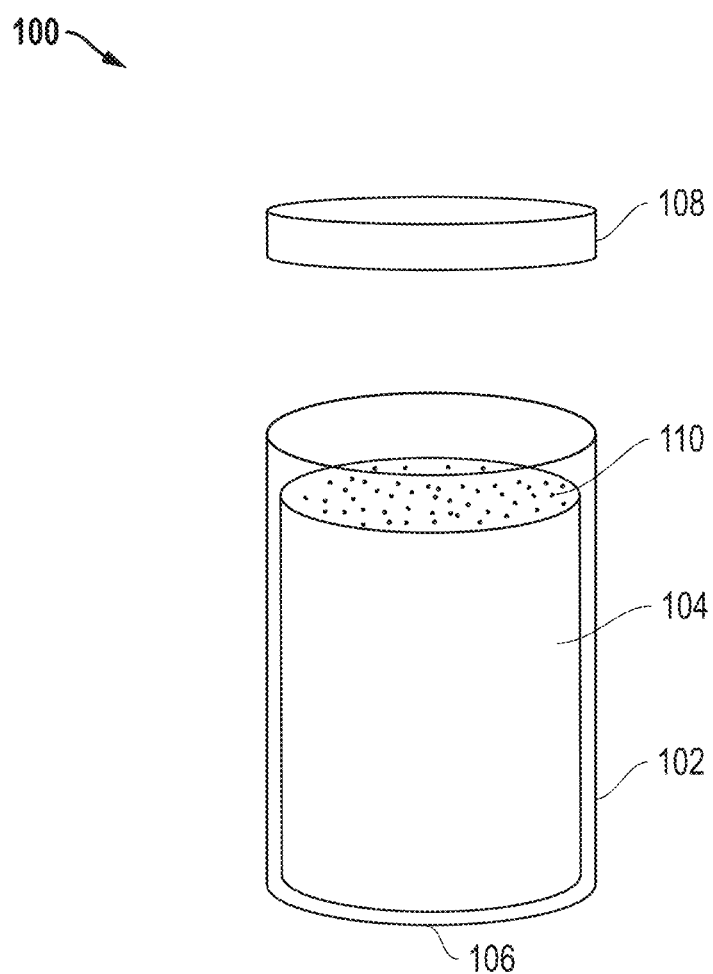
FIG. 1 is a simplified schematic drawing of a scintillator package according to an embodiment of the present invention.

Accordingly, preferred embodiments of the invention make use of an oxygen absorbing/scavenging material placed within the scintillator casing before it is sealed to further lower the $O_2$ levels within the casing. FIG. 1 is a simplified schematic drawing of a scintillation detector 100 according to an embodiment of the present invention. In FIG. 1, the scintillator casing 102 is shown as transparent for clarity. Scintillator 104 is placed within the casing 102 so that it is oriented toward sapphire window 106 at the front of the casing. A small space exists within the casing 102 between the end of the scintillator 104 and the end cap 108 (when installed). A quantity of oxygen absorbing pellets or beads 101 are preferably placed within this space inside the casing.

An oxygen absorber (sometimes referred to as an oxygen scavenger) is a material capable of absorbing or reacting with oxygen from surrounding atmosphere. Preferred oxygen absorbers for use with embodiments of the present invention include compounds that capture oxygen molecules without generating $H_2O$ or other gases, which can also degrade the scintillator material. Preferred oxygen absorbers are also stable at higher temperatures (up to ~250° C.). One such oxygen absorber would be Copper (I) Oxide ($Cu_2O$) which removes oxygen from the atmosphere by oxidizing to Copper (II) Oxide (CuO). Other materials with similar oxygen absorbing materials include Pd, ZnO, NiO, and/or $Al_2O_3$. In some embodiments, an oxygen absorber can be added to the interior of the scintillator housing in the form of a plurality of beads of the oxygen absorbing compound. Suitable oxygen absorbing compounds are commercially available in bead/pellet form, for example, under identification designations BASF R0-20 (Pd on $Al_2O_3$), R0-25 (Pd on $Al_2O_3$), R3-11 (CuO and Mg—Si), R3-11G (CuO and Mg—Si), Cu-02265 (CuO on $Al_2O_3$), Ni-3288 (Ni on support), and RCI 133T (CuO, ZnO, and $Al_2O_3$) from Research Catalysts, Inc., of Houston, Tex. In other embodiments, the oxygen absorber can be in any other suitable form, including for example the form of a packet, a powder, one or more pellets, a sheet, a tablet, or a sachet.

The amount of oxygen absorber than can be added to the interior of the scintillator housing will typically be limited by available space, but skilled persons will recognize that there is little disadvantage to adding too much, as opposed to a definite disadvantage from adding too little. Preferably the amount of oxygen absorber, in any of the forms described above, will be 10 grams or less, 5 grams or less, 2 grams or less, 1 gram or less, 0.5 grams or less, 0.1 grams or less, or 0.01 grams or less In some embodiments, the amount of oxygen absorber will be 0.01 grams to 10 grams, 0.01 grams to 1 gram; 1 gram to 2 grams, 2 to 5 grams, or 5 to 10 grams.

In preferred embodiments, the oxygen content within the sealed scintillator casing (after the oxygen content has been lowered by the oxygen absorber) will be not greater than 100 ppb. In certain other embodiments, the oxygen content within the casing is even less, such as not greater than about 90 ppb, not greater than about 50 ppb, not greater than about 30 ppm, or even not greater than about 10 ppb. The assembly atmosphere can have an oxygen content within a range between about 10 ppb and 100 ppb, between 10 ppb and 50 ppb, between 30 ppb and 50 ppb, or even between 1 ppb and 10 ppb.

Likewise, the atmosphere within the sealed scintillator casing also preferably has a water vapor content not greater than about 150 ppb. For example, in one embodiment, the atmosphere within the sealed scintillator casing has a water vapor content that is not greater than about 50 ppb, not greater than about 30 ppm, or even not greater than about 10 ppb. According to one certain embodiment, the sealed workbox has a water vapor content within a range between about 10 ppb and 100 ppb. In some embodiments, the $H_2O$ content can be lowered with the same compound used as an $O_2$ absorber. In other embodiments, a separate $H_2O$ absorber or desiccant can be used.

Figure 2:
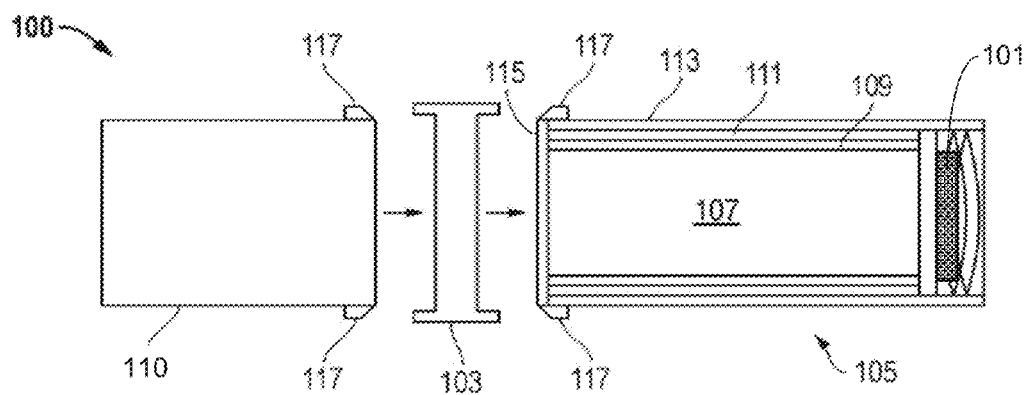
FIG. 2 illustrates a radiation detector 100 according to an embodiment of the present invention.

FIG. 2 illustrates a radiation detector 100 according to an embodiment of the present invention. As illustrated, the radiation detector includes a photosensor 110, light pipe 103, and a scintillator casing 105. As mentioned above, the scintillator casing 105 can include a scintillator 107 disposed within and substantially surrounded by a reflector 109 and a shock absorbing member 111. The scintillator 107, reflector 109, and the shock absorbing member 111 are housed within a casing 113 which includes a window 115 at one end of the casing 113. As discussed in more detail below, an oxygen absorbing material is also placed at the back of the casing, behind the scintillator, before the casing is sealed.

In further reference to FIG. 2, the photosensor 110 can be a device capable of spectral detection and resolution, such as a photomultiplier tube or other detection device. The photons emitted by the scintillator crystal 107 are transmitted through the window 115 of the scintillator casing 105, through the light pipe 103, to the photosensor 110. As is understood in the art, the photosensor 110 provides a count of the photons detected, which provides data on the radiation detected by the scintillator crystal. The photosensor 110 can be housed within a tube or housing made of a material capable of withstanding and protecting the electronics of the photosensor 110, such as a metal, metal alloy or the like. Various materials can be provided with the photosensor 110, such as within the housing, to stabilize the device during use and ensure good optical coupling between the light pipe 103 and the scintillator casing 105.

As illustrated, the light pipe 103 is disposed between the photosensor 110 and the scintillator casing 105. The light pipe 103 can facilitate optical coupling between the photosensor 110 and the scintillator casing 105. In the radiation detector of FIG. 2, the light pipe 103 can be coupled to the scintillator casing 105 and the photosensor 110 using biasing members 117 that provide a spring resiliency. Such biasing members 117 can facilitate absorption of shocks to the detector 100 which can reduce false readings and counts during use of the device.

Figure 3:
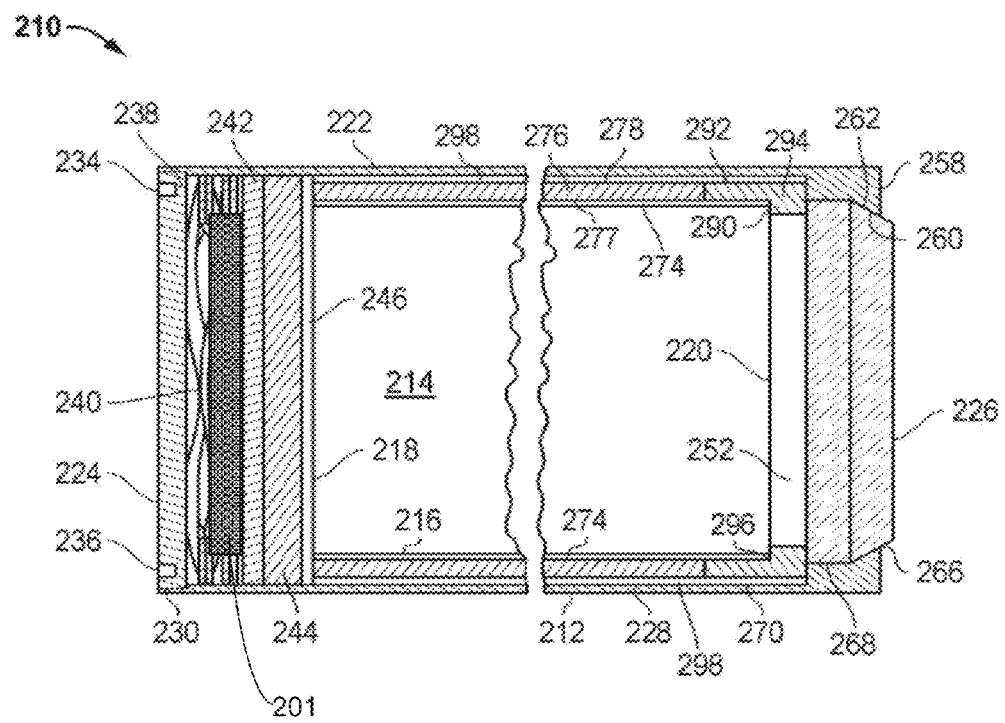
FIG. 3 is a cross-section of the scintillator casing of FIG. 2.

FIG. 3 is a cross-section of the scintillator casing of FIG. 2. The scintillation detector 210 includes a scintillator 214 disposed within a casing 212. The scintillator 214 can be an activated halide crystal, desirably a high performance rare-earth halide. Examples of rare-earth halides include activated rare-earth bromides, chlorides and iodides, including activated $LaBr_3$, $LaCl_3$, $LuI_3$, $GdI_3$, or $GdBr_3$. Particular activating species include cerium, praseodymium, europium, and neodymium. Particular scintillator compositions include cerium activated lanthanum bromide ($LaBr_3$:Ce), cerium activated lanthanum chloride ($LaCl_3$:Ce). Other materials include cerium activated gadolinium iodide ($GdI_3$:Ce), cerium activated lutetium iodide ($LuI_3$:Ce), and in some cases cerium bromide ($CeBr_3$) and cerium chloride ($CeCl_3$). Scintillator 214 will typically be in crystalline form, although non-crystalline scintillators, such as transparent ceramics, can also be used.

The scintillator crystal 214 can have various shapes, such as a rectangular shape, or a cylindrical surface 216 as illustrated including flat end faces 218 and 220. It will be appreciated that the surface finish of the scintillator crystal 214 can be sanded, polished, ground, etc., as desired.

In further reference to FIG. 3, the casing 212 can include a casing 222 that can be cylindrical or tubular to effectively fit the selected geometry of the scintillator crystal 214. The casing 222 can be closed at its rear end by a back cap 224 and at its front end by an optical window 226. The optical window 226 can include a material that is transmissive to scintillation light given off by the scintillator crystal 214, such as sapphire. The casing 222 and back cap 224 can be made of a non-transmissive material, such as a metal, metal alloy, or the like, such as titanium, stainless steel, or aluminum.

In preferred embodiments, an oxygen scavenging material can be placed within the housing in a space between the rear end of the scintillator and the end of the casing. Typically there is a small space toward the end of the casing that is approximately 1 inch in diameter and ¼ inch deep (thick). Oxygen scavenging material in the form of beads, pellets, etc. can just be poured into thus apace. In other embodiments, the oxygen scavenging material can be contained in, for example, a packet, bag, or a metal mesh sachet. In some embodiments, the oxygen scavenging material can be in the form of a solid tablet that can be inserted into the space at the end of the casing, for example inside the biasing member 117, 240.

The back cap 224 can be coupled to the casing 222 using a sealant, mechanical fasteners, or by a vacuum type peripheral weld. Preferably the method used produces an air-tight, hermetic seal that will not allow any $O_2$ to leak into the casing. The casing 222 can have a recess in the casing wall to form a welding flange 230, which facilitates fitting the back cap 224. Additionally, the back cap 224 can include an opening to its outer side such that annular grooves 234 and 236 are spaced slightly inwardly from the circumferential edge. Welding is performed at the outer ends of the welding flange 230 and the reduced thickness of a connecting portion 238 of welding flange 230 reduces welding heat, conducting heat away from the welding flanges to permit formation of a desired weld.

Optionally, scintillation detector 210 can further includes a biasing member 240, a backing plate 242, a cushion pad 244, and an end reflector 246. The biasing member 240 can include a spring, as illustrated, or other suitable resilient biasing members. The biasing member 240 functions to axially load the crystal and bias it towards the optical window 226. For example, the biasing member 240 can be a stack of wave springs disposed crest-to-crest as shown. Other suitable biasing members can include but are not limited to, coil springs, resilient pads, pneumatic devices or even devices incorporating a semi-compressible liquid or gel. As such, suitable materials for the biasing member 240 can include a metal, a metal alloy, polymers, or the like.

The backing plate 242 disperses the force of the biasing member 240 across the area of the cushion pad 244 for substantially uniform application of pressure and axial loading of the rear face 218 of the scintillator crystal 214. Alternatively, the backing plate and biasing member may be integrated into a single structure, such as in the case of an elastomeric polymer member, which may have a rigid reinforcement layer. The cushion pad 244 can typically be made of a resilient material such as a polymer, particularly an elastomer, such as, a silicone rubber. The thickness of the cushion pad 244 can vary within a range of about 1.5 mm to about 8 mm for most crystals.

Additionally, the cushion pad 244 can be adjacent to the end reflector 246. The end reflector 246 can include a suitable reflecting material such as a powder, like aluminum oxide (alumina) powder, or a reflective tape or foil such as, a white porous unsintered PTFE material. A porous reflective material facilitates the escape of air or gas from between the reflector film and crystal face and can avoid pockets of trapped air or gas which could prevent the end reflector 246 from being pushed by the cushion pad 244 flat against the rear end face 218 of the scintillator crystal 214 which can have a negative impact on reflectivity at the reflector-crystal interface. The reflector material may be about 0.25 mm thick, and may be a film wrapped at least once around the crystal or a metal foil disk, which conforms to the surface of the crystal end face 218 and provides suitable reflectance toward the optical window 226.

As indicated above, the biasing member 240 exerts a force on the scintillator crystal 214, to urge the scintillator crystal 214 towards the optical window 226 thereby maintaining suitable optical coupling between the scintillation crystal 214 and the optical window 226. An optional layer 252 (or interface pad) can be provided between the scintillator crystal 214 and the optical window 226 to facilitate effective optical coupling. For example, layer 252 can include a transparent polymer material, such as a transparent silicone elastomer. The thickness of the interface pad 252 can be within a range of about 1.5 mm to about 8 mm for most crystals.

In further reference to FIG. 3, as illustrated, the optical window 226 can be retained in the casing 222 by an annular lip 258 at the front end of the casing 222. The annular lip 258 can protrude radially inwardly from the casing wall 228 and can define an opening having a diameter less than the diameter of the optical window 226. Additionally, the annular lip 258 can have an inner beveled surface 260 and the optical window 226 can include a corresponding beveled, circumferential edge surface 262 that engages the inner beveled surface 260. The mating beveled surfaces can be hermetically sealed by a high temperature solder such as 95/5 or 90/10 lead/tin solder. The solder also aids in restraining the optical window 226 against axial push-out, in addition to providing a high temperature seal. The optical window 226 can be axially trapped between the annular lip 258 and the scintillator crystal 214 such that it can be radially constrained by the casing wall 222. Optionally, to permit wetting of the optical window 226 by the solder, the sealing edge surfaces of the optical window 226 can include a metalized coating such as platinum.

The inner beveled surface 260 can forwardly terminate at a cylindrical surface 266 and rearwardly at a cylindrical surface 268. The cylindrical surface 268 closely surrounds a portion of the optical window 226 and extends axially inwardly to a cylindrical surface 270, which extends axially to the flange 230 at the opposite end of the casing 222. The interface of the optical window 226 is aligned with the annular shoulder formed between the cylindrical surfaces 268 and 270. The scintillator crystal 214 can be substantially surrounded by a reflector 274. The reflector 274 can be formed from a porous material including a powder, foil, metal coating, or polymer coating. As noted above, air or gas that might otherwise be trapped between the end reflector 246 and the scintillator crystal 214 can escape through the porous reflector 274.

In addition to the reflector 274 surrounding the scintillator crystal 214, a shock absorbing member 276, can substantially surround the scintillator crystal 214. The shock absorbing member 276 can surround and exert a radial force on the reflector 274 and the scintillator crystal 214. As shown, the shock absorbing member 276 can be cylindrical to accompany the selected shape of the scintillator crystal 214. The shock absorbing member 276 can be made of a resiliently compressible polymer, such as an elastomer. Additionally, the surface contour of the shock absorbing member 276 can vary along the length to provide a frictionally engaging surface thereby enhancing the stabilization of the scintillator crystal 214 within the casing 222. For example, the shock absorbing member 276 can have a uniform inner surface 277 and an outer surface 278, or optionally, can have ribs extending axially or circumferentially on the inner surface 277, the outer surface 278, or both. Still, the shock absorbing member 276 can have protrusions, dimples, or other shaped irregularities on the inner surface 277, the outer surface 278, or both surfaces to frictionally engage the scintillator crystal 214 and the casing 222.

As also illustrated, the scintillation detector 210 can include a ring 290 that extends from the front end of the shock absorbing member 276 to the optical window 226. The ring 290 facilitates stabilization and alignment of the circular interface pad 252 during assembly of the scintillation detector 210. The ring 290 has an axially inner end portion 292 substantially surrounding the scintillator crystal 214 and an axially outer end portion 294 substantially surrounding the interface pad 252. The intersection of the interior surfaces of the axially inner end portion 292 and the axially outer end portion 294 can include a shoulder 296, which facilitates positioning of the ring 290 on the scintillator crystal 214 during assembly. The ring 290 can be made of resilient material, such as a polymer, and can include silicone. Additional material, such as alumina powder can be added to enhance the reflection of the ring 290. The ring 290 and the shock absorbing member may alternatively be integrated together as a continuous integral component.

In further reference to the components of the scintillation detector 210 as illustrated in FIG. 3, a sleeve 298 extends longitudinally from the optical window 226 to approximately the back cap 224. The sleeve 298 can substantially surround the shock absorbing member 276 and scintillator crystal 214 and in a compressed state (when fitted within the casing 222) provides a radially compressive force to the shock absorbing member 276 and scintillator crystal 214. Insertion of the sleeve 298 into the casing 222 requires compression of the sleeve thereby providing a radially compressive force on the crystal 214. Suitable materials for the sleeve 298 include resilient materials, such as a metal, metal alloy, a polymer, carbon or the like. Additionally, the sleeve 298 can include a material that has a lower coefficient of friction with the material of the casing 222 than does the material of the shock absorbing member 276 with the material of the casing 222.

The radiation detector shown in FIGS. 1 and 2 is preferably assembled in an inert atmosphere to minimize the amount of oxygen or water vapor that is sealed within the casing with the scintillator. The components of the scintillation detector, including a scintillator crystal that has been cleaned and conditioned using known methods, are placed into a workbox containing an inert atmosphere. Typically, the workbox will provide a large sealed interior space accessed using gloves that are sealed to the sides of the workbox. The atmosphere within the workbox preferably comprises a controlled atmosphere having a low level of contaminants, particularly having low levels of oxygen and water vapor. As such, the assembly atmosphere preferably contains an inert or noble gas. Suitable inert gases include, for example, argon, helium, and/or nitrogen.

Figure 4:
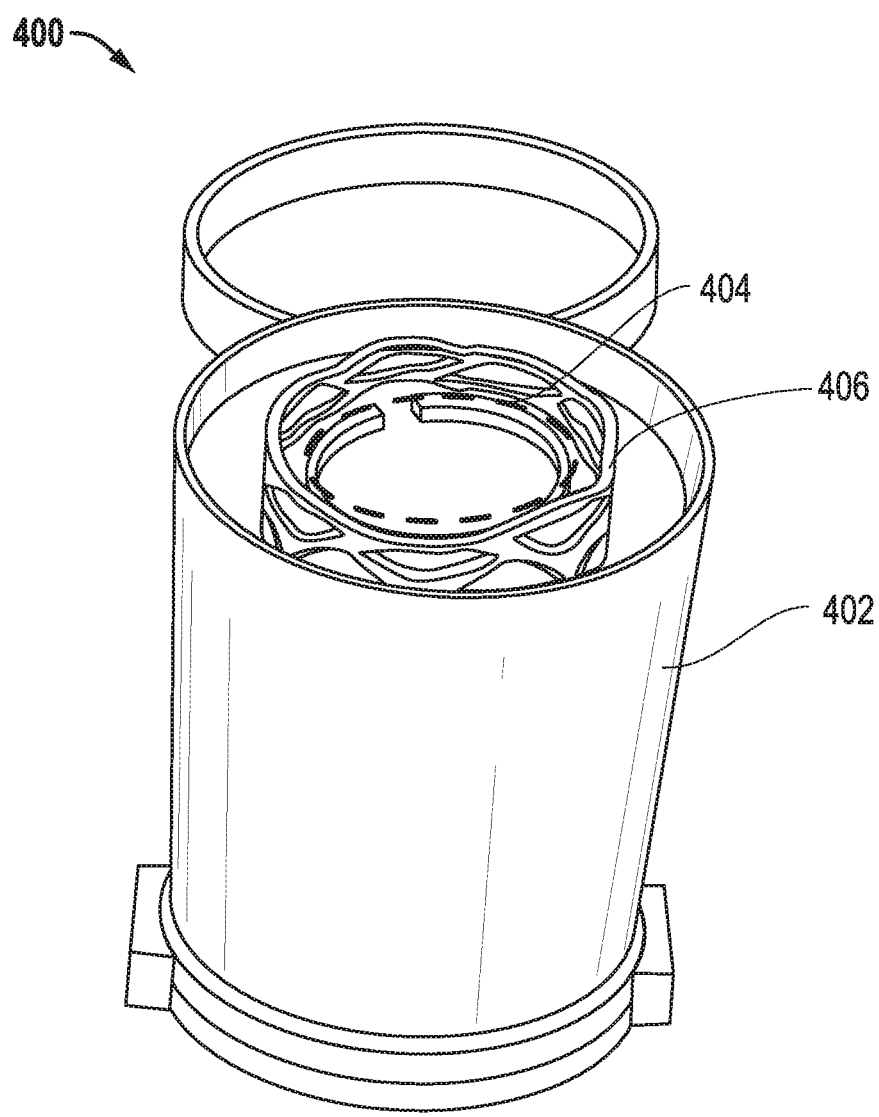
FIG. 4 is a photograph of a scintillator casing according to an embodiment of the present invention.

Assembly of the detector within the inert atmosphere of the workbox can include forming a detector as illustrated in FIG. 3, including, for example, the scintillator crystal, reflector, shock absorbing member, interface pad, sleeve, springs, the casing, and other components described herein. FIG. 4 is a photograph of a scintillation detector 400 in which the scintillator and all of the components described above have been assembled within the casing 402. In this embodiment, oxygen scavenging material could be added at the rear of the casing 404, within the ring of wave spring biasing members 406. After assembling the components and adding the oxygen absorber, the detector can be permanently sealed. In accordance with one embodiment, the sealing process includes a welding or brazing operation that seals the back cap onto the back end of the casing and welded in place, thus providing a hermetic seal that prevents $O_2$ and/or $H_2O$ vapor from leaking into the casing.

As taught by Menge, described above, the amounts of $O_2$ and $H_2O$ within the inert atmosphere are ideally in the range of 0.01 to 10 ppm for $O_2$ and 0.01 to 15 ppm for $H_2O$. Applicants have discovered, however, that despite these low levels, premature failures of scintillation detectors operated at high temperatures are still being caused by the presence of $O_2$ and/or $H_2O$ within the scintillator casing.

As discussed above, the reasons for such failures are two-fold. First, it is very difficult to ensure that the atmosphere within the scintillator casing actually has $O_2$ and $H_2O$ levels as low as the ranges specified by Menge. Applicants believe that in many cases atmospheric $O_2$ and/or $H_2O$ infiltrates the atmosphere in the casing, either by contamination in the inert gas, infiltration into the workbox in which the scintillation detector is assembled, or by leaking into the scintillator casing after the casing is sealed and removed from the inert atmosphere.

Further, Applicants have discovered that even those very small amounts of $O_2$ and $H_2O$ are still high enough to cause premature failure of the scintillation detector when operated at high temperatures. As discussed in more detail below, Applicants believe that $O_2$ and/or $H_2O$ levels of less than 0.01 ppm are desirable, preferably levels of about 3 ppb or even less.

According to embodiments herein, the completed scintillation detector was found to have notable performance attributes. Embodiments utilizing rare earth halide crystals and oxygen absorbers within the scintillator casing were found to have exceptional performance even after exposure to elevated temperatures for extended durations.

Figure 5:
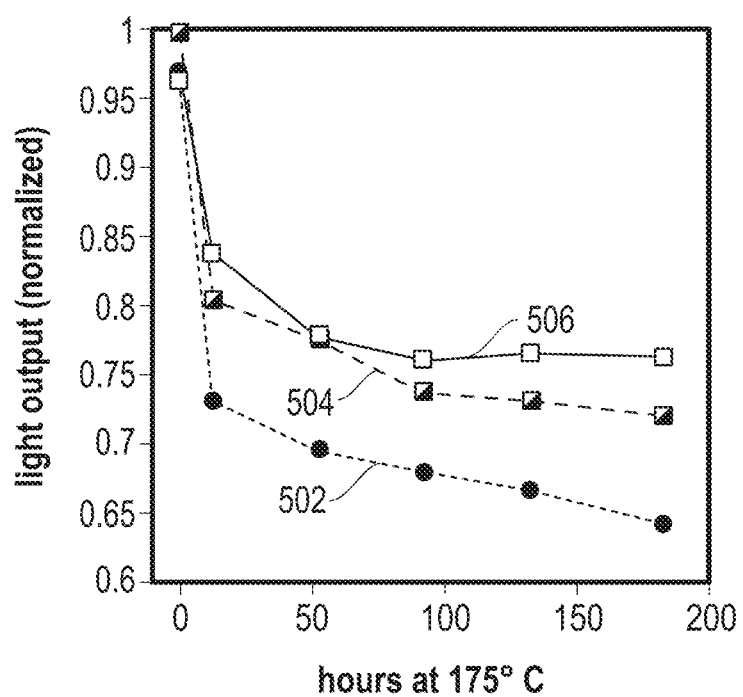
FIG. 5 is a plot showing normalized light output of three scintillation detectors as a function of hours at 175° C.

FIG. 5 is a plot showing normalized light output of three scintillation detectors as a function of hours at 175° C. Plots 502 and 504 represent the light output of scintillation detectors assembled in a sealed inert atmosphere containing from 100 to 200 ppb oxygen at a pressure of 1.0 atm (a partial pressure of oxygen of about $1\times10^{-7}$ atm) and less than 1 ppm $H_2O$ in bulk of argon at a pressure of 1.0 atm.

Plot 506 represents the light output of a scintillation detector assembled in the same inert atmosphere, but also including an oxygen absorber within the scintillator housing. In the example of FIG. 5, activated CuO (Cu-0226) was used as the oxygen absorber, although other suitable oxygen absorbers could be used as described herein.

As clearly illustrated in FIG. 5, the scintillation detectors formed to according to the conventional process in a low $O_2$ atmosphere has a significantly lower light output than the scintillation detector including the oxygen absorber after only about 10 hours at 175° C. Further, even after more than 150 hours, the light output of the scintillators in plots 502 and 504 was still degrading, while the light output of the scintillation detector including the oxygen absorber shown in plot 506 had stabilized.

The performance of the scintillation detectors can be quantified in terms of relative light output $LO_{(r)}$, wherein $LO_{(r)}=(LO_{150}/LO_0)\times100\%)$, wherein $LO_{150}$ is the detected light output of the detector of about 150 hours of exposure at 175° C., and $LO_0$ is the original detected light output at room temperature prior to exposure at 175° C. Embodiments of the present invention will preferably have a relative light output $LO_{(r)}$ of not less than about 75%. Further, the relative light output at $LO_{200}$ will be no more that 2.5% lower than the output at $LO_{100}$, such as no more than 2.0% lower, no more than 1.0% lower, or no lower. For clarity, the general designation "$LO_t$" is used herein to define the detected light output of the scintillation detector after a time of operation "t". Unless otherwise specified herein, light output values are measured at room temperature, and are generated from application of 2.614 MeV gamma rays issuing from a thorium isotope, Th-232. $LO_0$ is measured at room temperature prior to exposure at elevated temperatures and $LO_t$ where t>0 is measured after cooling the detector from an elevated temperature to room temperature.

Figure 6:
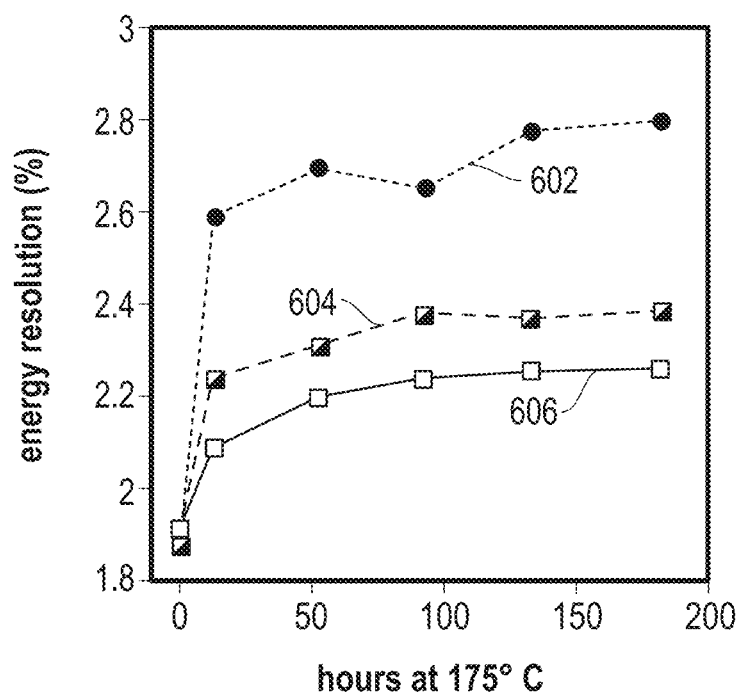
FIG. 6 is a plot showing energy resolution for three scintillation detectors as a function of hours at 175° C.

In addition to the improved light output performance noted above, the scintillation detector according to embodiments of the present invention also displayed superior energy resolution, especially after exposure to elevated temperatures for extended durations. The sensitivity of a detector can be quantified by the energy resolution, or the ability of the detector to accurately identify the energy of certain radiation. Typically, the resolution is quantified by determining full width half maximum (FWHM) values from a spectral curve (typically a Gaussian-shaped curve) for radiation striking the detector at a given energy. The smaller the FWHM value for a given spectral curve, the greater the energy resolution and accuracy of measurements. Exposure of a scintillation detector to elevated temperatures causes a decrease in the resolution that is detectable by an increase in the FWHM capabilities of the detector. The absolute energy resolution can be defined by the actual FWHM values FIG. 6 is a plot showing energy resolution for three scintillation detectors as a function of hours at 175° C. Plots 602 and 604 represent the light output of scintillation detectors assembled in a sealed inert atmosphere containing from 100 to 200 ppb oxygen. Plot 606 represents the light output of a scintillation detector assembled in the same inert atmosphere, but also including an oxygen absorber within the scintillator housing. The detector according to embodiments of the present invention demonstrated an energy resolution of about 2.2% when measured at room temperature after 150 hours of exposure at 175° C. Embodiments of the present invention will preferably have an energy resolution of not greater than about 2.3%, 2.2%, 2.1%, 2.0%, or even 1.8%, when measured at room temperature after 150 hours of exposure at 175° C. Like the performance characteristics detailed previously, the general designation "$ER_t$" is used herein to define the energy resolution of the scintillation detector after a time of operation "t." The light output and energy resolution values are measured at room temperature and are generated from application of 2.614 MeV gamma rays issuing from a thorium isotope, Th-232. $ER_0$ is measured at room temperature prior to exposure at elevated temperatures and $ER_t$ where t>0 is measured after cooling the detector from an elevated temperature to room temperature.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa. Embodiments may be in accordance with any one or more of the items as listed below.

Item 1. A scintillation detector comprising:
a halide scintillator in a sealed casing having an atmosphere with an oxygen content at a pressure of about 1.0 atm of not greater than about 100 ppb; and
an oxygen scavenger in the atmosphere within the sealed casing.

Item 2. A scintillation detector comprising:
a scintillator comprising a material that is damaged by exposure to oxygen; a sealed casing surrounding the scintillator and containing a controlled atmosphere having an oxygen content at a pressure of about 1.0 atm of not greater than about 100 ppb; and
an oxygen scavenger located in the controlled atmosphere within the sealed casing.

Item 3. A scintillation detector comprising:
a sealed casing comprising a hermetic seal;
an atmosphere within the sealed casing having an oxygen content at a pressure of about 1.0 atm of not greater than about 100 ppb;
a scintillator within the sealed casing; and
an oxygen scavenger located in the controlled atmosphere within the sealed casing.

Item 4. A method of assembling a scintillation detector comprising:
placing a scintillator in a casing;
providing a controlled atmosphere within the casing having an oxygen content at a
pressure of about 1.0 atm of not greater than about 10 ppm;
placing an oxygen scavenger inside the casing;
sealing the casing so that the scintillator and the oxygen scavenger are maintained in the controlled atmosphere within the sealed casing;
maintaining the scintillator at a temperature of less than about 150° C. for a period of time sufficient for the oxygen scavenger to lower the oxygen content in the controlled atmosphere to less than about 100 ppb, about 90 ppb, about 50 ppb, about 30 ppb, about 10 ppb, or between about 1 ppb and 10 ppb.

Item 5. A method of assembling a scintillation detector comprising sealing a scintillator and an oxygen scavenger within a casing having an atmosphere with an oxygen content not greater than about 1 ppm.

Item 6. A scintillation detector according to any one of Items 2-5 wherein the scintillator comprises a halide crystalline material.

Item 7. A scintillation detector according to any one of the preceding Items wherein the scintillator comprises a rare-earth halide crystalline material.

Item 8. A scintillation detector according to any one of the preceding Items in which the oxygen scavenger comprises an oxidizable compound.

Item 9. A scintillation detector according to any one of the preceding Items in which the oxygen scavenger comprises an oxidizable inorganic compound.

Item 10. A scintillation detector according to any one of the preceding Items in which the oxygen scavenger comprises a metal or metal oxide.

Item 11. A scintillation detector according to any one of the preceding Items in which the oxygen scavenger comprises an inorganic oxygen scavenger.

Item 12. A scintillation detector according to any one of the preceding Items in which the oxygen scavenger comprises Pd, $Cu_2O$, CuO, ZnO, NiO, $Al_2O_3$ or any combination thereof.

Item 13. A scintillation detector according to any one of the preceding Items in which the oxygen scavenger is in the form of a packet, a powder, one or more pellets, a sheet, a tablet, or a sachet.

Item 14. A scintillation detector according to any one of the preceding Items in which the oxygen scavenger is positioned at the back of the scintillation inside the sealed casing.

Item 15. A scintillation detector according to any one of the preceding Items having a relative light output $LO_{(r)}=((LO_{150})/(LO_0))\times 100\%$, of not less than about 75% wherein $LO_{150}$ is the detected light output of the detector after about 150 hours of exposure at 175° C., and $LO_0$ is the original detected light output at room temperature prior to exposure at 175° C.

Item 16. The scintillation detector of Item 0, wherein $LO_{(r)}$ is not less than about 80%.

Item 17. The scintillation detector of Item 0, wherein $LO_{(r)}$ after 200 hours of exposure at 175° C. is no more than about 2.5% lower than $LO_{(r)}$ after 100 hours of exposure at 175° C.

Item 18. A scintillation detector according to any one of the preceding Items in which the scintillator is a material selected from the group consisting of activated lanthanum bromide and activated lanthanum chloride.

Item 19. A scintillation detector according to any one of the preceding Items in which the scintillator is a material is $La_{(1-x)}Ce_xBr_3$, where x=0-1.

Item 20. A scintillation detector according to any one of the preceding Items, further comprising a shock absorbing member substantially surrounding the scintillator crystal.

Item 21. A scintillation detector according to any one of the preceding Items, wherein the controlled atmosphere within the sealed casing different than the ambient atmosphere has an oxygen content at a pressure of about 1.0 atm of not greater than about 100 ppb, about 90 ppb, about 50 ppb, about 30 ppb, about 10 ppb, or between about 1 ppb and 10 ppb.

Item 22. A scintillation detector according to any one of the preceding Items, further comprising a reflector disposed between the scintillator and the shock absorbing member and substantially surrounding the scintillator crystal.

Item 23. A scintillation detector according to any one of the preceding Items, further comprising a sleeve substantially surrounding the shock absorbing member.

Item 24. A scintillation detector according to any one of the preceding Items, further comprising a light sensing device optically coupled to the scintillator crystal.

Item 25. A scintillation detector according to any one of the preceding Items, further comprising a photosensor optically coupled to the scintillator and operative to convert photons emitted by the scintillator into an electrical signal.

Item 26. A scintillation detector according to any one of the preceding Items, further comprising a photomultiplier tube, hybrid photomultiplier, photodiode, or silicon photomultiplier coupled to the scintillation detector.

Item 27. A scintillation detector according to any one of the preceding Items, further comprising a light pipe disposed between the scintillation detector and the photomultiplier tube.

Item 28. A scintillation detector according to any one of the preceding Items wherein the sealed casing is hermetically sealed around the scintillator crystal.

Item 29. Any one of the preceding Items in which the controlled atmosphere comprises an inert gas.

Item 30. Any one of the preceding Items in which the controlled atmosphere comprises argon, helium, and/or nitrogen.

Item 31. Any one of the preceding Items in which the controlled atmosphere comprises a water vapor content at a pressure of about 1.0 atm of not greater than about 100 ppb, about 90 ppb, about 50 ppb, about 30 ppb, about 10 ppb, or between about 1 ppb and 10 ppb of water vapor.

Note that not all of the activities described above in the general description or the examples are required, that a portion of a specific activity may not be required, and that one or more further activities may be performed in addition to those described. Still further, the order in which activities are listed is not necessarily the order in which they are performed.

The present invention has broad applicability and can provide many benefits as described and shown in the examples above. The embodiments will vary greatly depending upon the specific application, and not every embodiment will provide all of the benefits and meet all of the objectives that are achievable by the invention. Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present). Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A scintillation detector comprising:
    a scintillator comprising a material that is capable of reacting with oxygen;
    a sealed casing surrounding the scintillator and containing a controlled atmosphere having an oxygen content at a pressure of about 1.0 atm of not greater than about 100 ppb;
    a reflector adjacent to the scintillator and within the sealed casing; and
    an oxygen scavenger located in the controlled atmosphere within the sealed casing and separate from the scintillator.

2. The scintillation detector of claim 1, wherein the scintillator comprises a halide crystalline material.

3. The scintillation detector of claim 1, wherein the scintillator comprises a rare-earth halide crystalline material.

4. The scintillation detector of claim 1, wherein the oxygen scavenger comprises an oxidizable compound.

5. The scintillation detector of claim 1, wherein the oxygen scavenger comprises an oxidizable inorganic compound.

6. The scintillation detector of claim 1, wherein the oxygen scavenger comprises a metal or metal oxide.

7. The scintillation detector of claim 1, wherein the oxygen scavenger comprises an inorganic oxygen scavenger.

8. The scintillation detector of claim 1, wherein the oxygen scavenger comprises Pd, $Cu_2O$, CuO, ZnO, NiO, $Al_2O_3$ or any combination thereof.

9. The scintillation detector of claim 1, wherein the oxygen scavenger is in the form of a packet, a powder, one or more pellets, a sheet, a tablet, or a sachet.

10. The scintillation detector of claim 1, wherein the oxygen scavenger is positioned at the back of the scintillation inside the sealed casing.

11. The scintillation detector of claim 1, wherein the scintillator is a material is $La_{(1-x)}Ce_xBr_3$, where x=0-1.

12. The scintillation detector of claim 1, wherein the controlled atmosphere within the sealed casing different than the ambient atmosphere has an oxygen content at a pressure of about 1.0 atm of not greater about 10 ppb.

13. The scintillation detector of claim 1, further comprising a photosensor optically coupled to the scintillator and operative to convert photons emitted by the scintillator into an electrical signal.

14. The scintillation detector of claim 1 wherein the sealed casing is hermetically sealed around the scintillator crystal.

15. The scintillation detector of claim 1, wherein the controlled atmosphere comprises a water vapor content at a pressure of about 1.0 atm of not greater than about 100 ppb.

16. A scintillation detector comprising:
    a sealed casing comprising a hermetic seal;
    a controlled atmosphere within the sealed casing having an oxygen content at a pressure of about 1.0 atm of not greater than about 100 ppb;
    a scintillator within the sealed casing; and
    an oxygen scavenger located in the controlled atmosphere within the sealed casing,
    wherein the scintillator has a relative light output $LO_{(r)}=((LO_{150})/(LO_0))\times100\%$, of not less than about 75% wherein $LO_{150}$ is the detected light output of the detector after about 150 hours if exposure at 175° C., and $LO_0$ is the original detected light output at room temperature prior to exposure at 175° C.; and
    wherein $LO_{(r)}$ after 200 hours of exposure at 175° C. is no more than about 2.5% lower than $LO_{(r)}$ after 100 hours of exposure at 175° C.

17. The scintillation detector of claim 16, wherein the scintillator comprises a halide crystalline material.

18. The scintillation detector of claim 16, wherein the scintillator comprises a rare-earth halide crystalline material.

19. A method of assembling a scintillation detector comprising:
    placing a scintillator in a casing;
    providing a controlled atmosphere within the casing having an oxygen content at a pressure of about 1.0 atm of not greater than about 10 ppm;
    placing an oxygen scavenger inside the casing;
    sealing the casing so that the scintillator and the oxygen scavenger are maintained in the controlled atmosphere within the sealed casing;

maintaining the scintillator at a temperature of less than about 150° C. for a period of time sufficient for the oxygen scavenger to lower the oxygen content in the controlled atmosphere to less than about 100 ppb.

20. The method of claim 19, wherein sealing comprises sealing a scintillator and an oxygen scavenger within a casing having an atmosphere with an oxygen content not greater than about 1 ppm.

* * * * *